April 7, 1942. C. W. BAUBERGER ET AL 2,278,639
CLUTCH PLATE ADJUSTER
Filed Sept. 22, 1939   3 Sheets-Sheet 1

Charles W. Bauberger
Edward T. Liess
INVENTORS

BY
ATTORNEY

April 7, 1942.  C. W. BAUBERGER ET AL  2,278,639
CLUTCH PLATE ADJUSTER
Filed Sept. 22, 1939  3 Sheets-Sheet 2
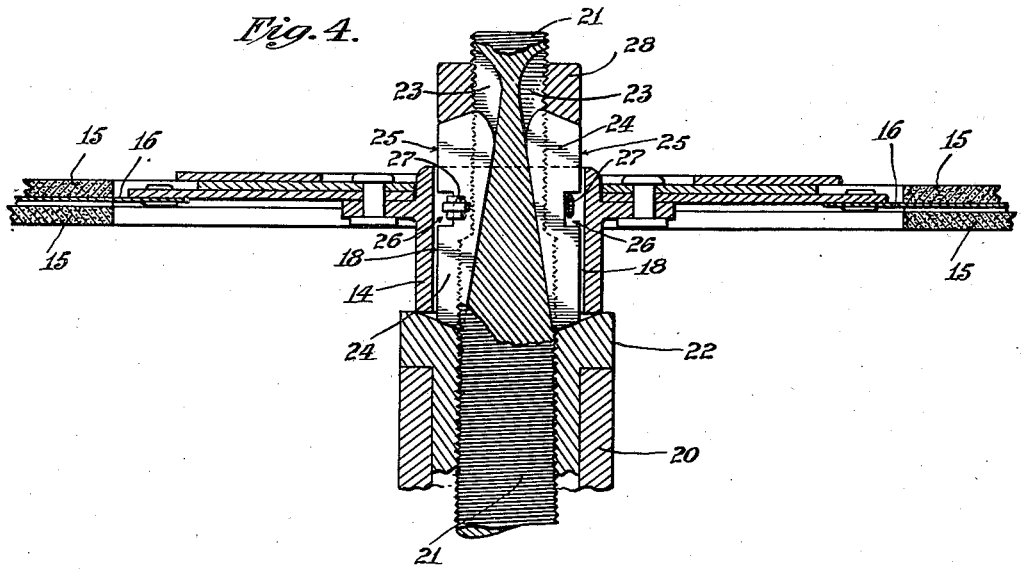
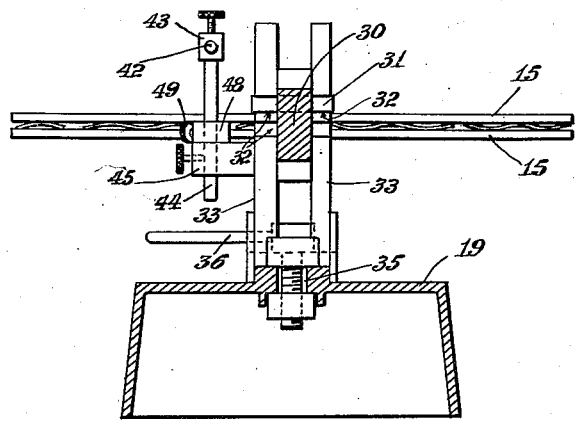
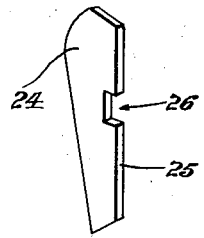
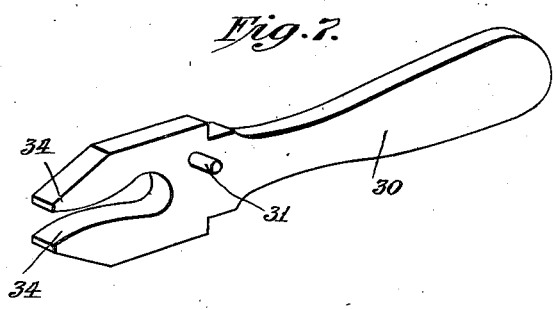
Charles W. Bauberger
Edward T. Liess
INVENTORS
BY
ATTORNEY April 7, 1942.　　C. W. BAUBERGER ET AL　　2,278,639
CLUTCH PLATE ADJUSTER
Filed Sept. 22, 1939　　3 Sheets-Sheet 3
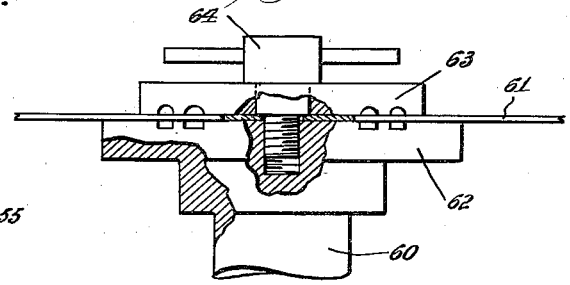
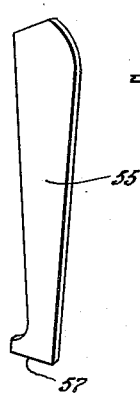
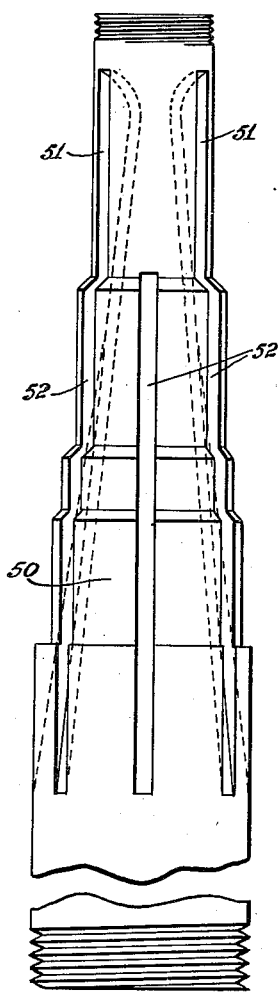
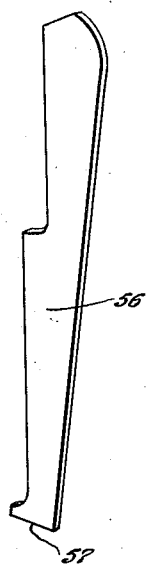
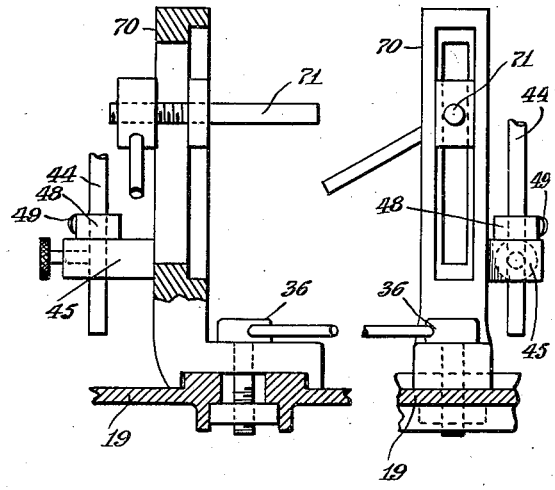
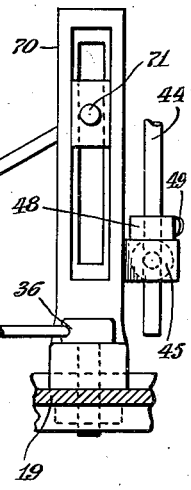
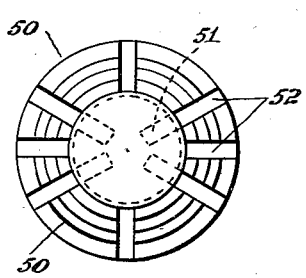
Charles W. Bauberger
Edward T. Liess
INVENTORS
BY
ATTORNEY Patented Apr. 7, 1942

2,278,639

UNITED STATES PATENT OFFICE 2,278,639

CLUTCH PLATE ADJUSTER

Charles W. Bauberger and Edward T. Liess,
Malverne, N. Y.

Application September 22, 1939, Serial No. 296,044

2 Claims. (Cl. 279—2)

This invention relates to a machine for checking and truing up automobile clutch plates.

One form of clutch plate embodies a hub with a friction ring connected to it by more or less bendable or resilient arms or spokes. In order to ensure uniform clutch action it is highly important that the friction ring or rings shall be as nearly true as possible. In good practice a tolerance of only + or −.015 inch is permitted.

The main object of this invention is to provide a fixture or device by means of which the friction surface of a clutch plate may be readily checked and corrected if and where necessary.

Another object is to provide a device of this character which can be adjusted to handle clutch rings or plates of different sizes.

It is especially desired to provide an adjuster for plates whose hubs have grooves and lands or splines and bendable arms or spokes, such for instance as shown in United States Letters Patent Nos. 1,652,006 and 1,830,746.

In its simplest form the device includes a special arbor or post with adjustable blades for engaging in the grooves of the hub of the clutch plate and clamp nuts for centering the blades in the hub and holding the plate on an axis at right angles to the correct plane of the friction rings. This post is mounted on a base which also supports a bending member having jaws movable at right angles to the plane of the friction rings. This bending member is preferably adjustable toward and from the axis of the clutch plates so as to enable the device to handle plates of different diameters and adjustable parallel to the axis to accommodate plates having different lengths of hubs.

We also preferably provide a gage or dial indicator adjustably supported adjacent the bending member so that the operator can readily check and recheck the amount of adjustment or correction required.

Fig. 4 is a vertical sectional view showing the clutch plate and the supporting arbor on a larger scale, the edges of the friction rings being broken away, the section being taken on the plane of the line 4—4 of Fig. 2.

Fig. 5 is a vertical sectional view and projection, the section being taken on the plane of the line 5—5 of Fig. 2.

Fig. 6 is a perspective view of one of the arbor blades or keys.

Fig. 7 is a perspective view of a bending lever.

Fig. 8 is a side view of a modified form of arbor.

Fig. 9 is a plan view of the same.

Figs. 10 and 11 are detail views of modified forms of blades or keys.

Fig. 12 is a side view of a modified form of holder with a fragment of another form of clutch plate.

Figs. 13 and 14 are side and end views of a second form of supporting post for the bending member and the indicator.

Figure 1:
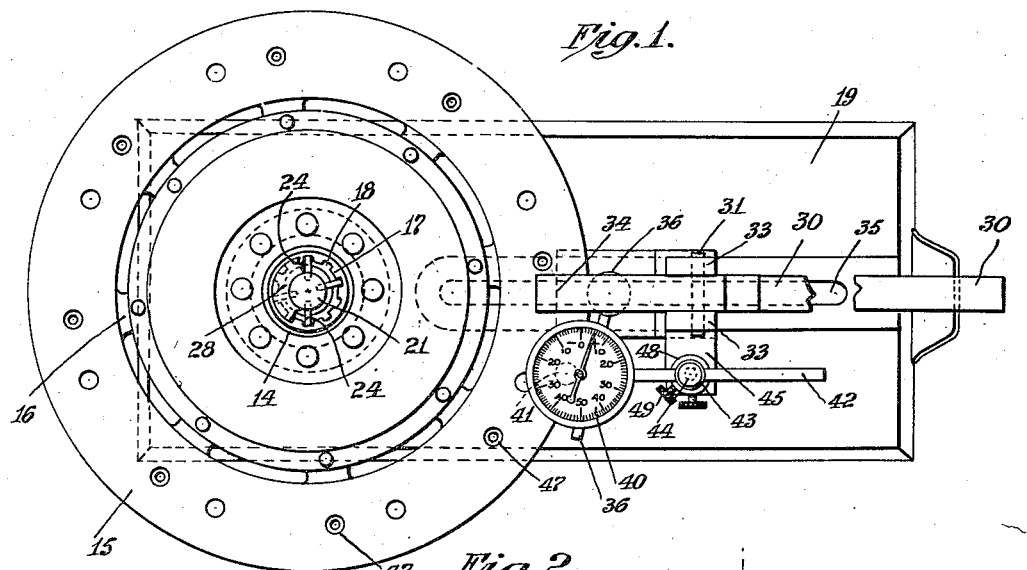
Fig. 1 is a plan view of one form of device involving the invention showing a clutch disc or plate in place.

A typical clutch plate has a hub 14 with friction rings 15, 15 carried by bendable spokes or arms 16. The hub has splines or lands 17 with slots or grooves 18 between them.

The base 19 has a socket or bearing 20 for receiving the screw threaded arbor 21 and a lower clamp nut 22 which may be knurled to facilitate adjustment of the nut on the arbor. The arbor also has a number of guide-ways or grooves 23 tapered longitudinally in which are mounted tapered keys or blades 24. These keys are so shaped that when seated in the grooves of the arbor their outer edges 25 are parallel with the axis of the arbor. We choose to have these keys engage in the bottoms of the grooves of the hub 18 rather than the inner edges of the splines 17 because we have discovered that the splines become worn and may be out of alignment whereas the grooves remain true. These keys are preferably notched at 26 to receive a contracting spring member such as an elastic rubber band 27 for drawing the keys against the arbor. A knurled nut 28 screw threaded on the upper end of the arbor serves to force the keys into the grooves 23 and thus force them outwardly so as to center the hub on the arbor. The bottom nut 22 is drawn up to support the hub 14 in its proper position. A number of sets of keys of different sizes may be provided with each arbor so as to adapt the device to different sizes of hubs. For instance, one set may allow for expansion from 1⅜″ to 1⅞″ and another set may allow expansion from 1¼″ to 1½″.

The bending device as here shown is a lever 30 having a hinge pin 31 adapted to be seated in any one of a number of seats 32 at different levels in a post 33 carried by the base 19. This lever 30 has jaws 34, 34 disposed on opposite faces of the friction rings 15, 15 so that by applying pressure to one face or the other the arms 16 of the clutch plate may be bent and the rings made true.

The post 33 is mounted to slide in a groove 35 which is arranged to extend radially of the axis of the arbor bearing 20. A clamp 36 serves to lock the post in the desired position.

In order to check the inaccuracies of the friction rings, we prefer to provide a dial indicator 40 of suitable form having a spring pressure foot or feeler 41 adapted to rest on the surface of the upper ring and to be adjusted to a position adjacent the point of application of the bending jaws. For this purpose the supporting rod 42 of the indicator is clamped in a bearing member 43 on a rod 44 which is adjustable in height in the bearing 45 and rotatable. It is therefore possible to adjust the feeler or pressure foot so as to bring it as close as possible to the bending device and yet escape the recesses 47 in which are located the rivets which hold the friction rings in place.

A stop 48 may be secured on rod 44 by a set screw 49 so as to form a stop to facilitate positioning the rod and attached indicator 40.

The arbor 50 shown in Figs. 8 and 9 has a number of different diameter and sets of grooves 51, 52 for the keys or blades so that it can be used for different sizes of clutch discs.

Figs. 10 and 11 show keys or blades 55, 56 of different forms and sizes. It will be noted that no notches such as 26 in Fig. 6 are shown. It has been found that these blades can be frictionally or resiliently held in the grooves of the arbor so that they will stay in place while applying the clutch disc and can then be moved into place when tightening the top nut 28 (of Fig. 4). The lower ends are bevelled off at 57 so as to provide a good bearing and tend to draw the blades inwardly against the bottom of the grooves 23 in the arbor 21 when the lower nut 22 is tightened.

The plate holder of Fig. 12 has a central arbor 60 adapted to fit in the bearing 20 of the base. This is intended to hold a different type of clutch plate or disc having a central web 61. The holder has a hub 62 on which the web 61 is supported. The top disc 63 fits over the web and is clamped in place by a clamp 64 which passes through parts 63 and 61 and is screwed into the hub disc 62.

Figure 2:
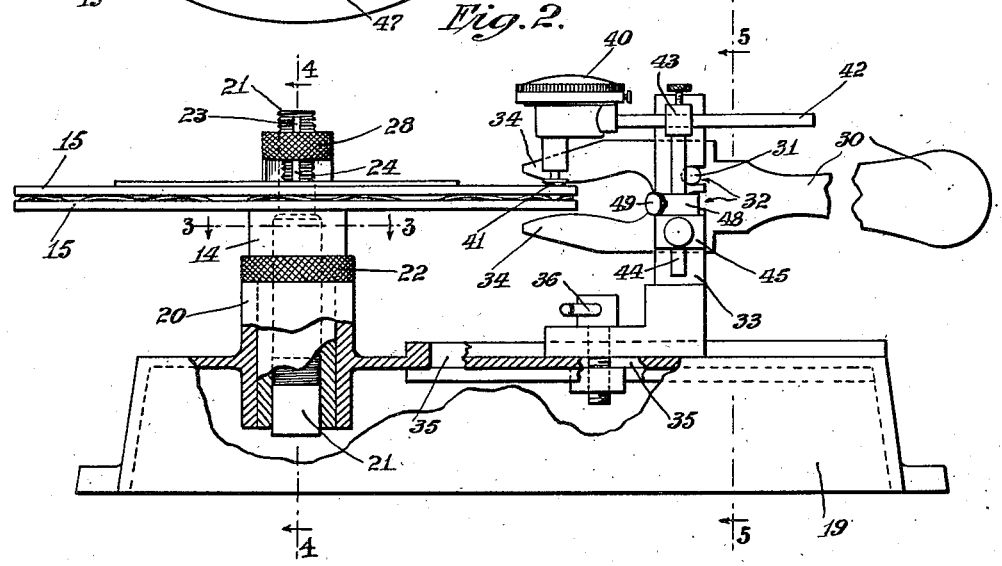
Fig. 2 is a side view showing parts broken away and in section.
Figure 3:
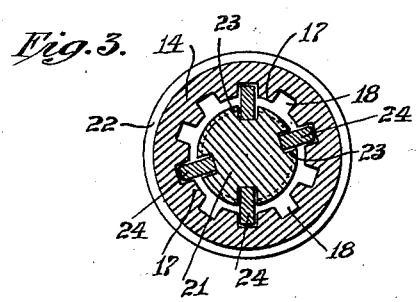
Fig. 3 is a horizontal sectional view of the hub of the clutch plate and the supporting arbor, the section being taken on the plane of the line 3—3 of Fig. 2.

The supporting post 70 is adapted to be adjustably secured to the base 19 as in the form of Figs. 1, 2 and 5. A pin 71 is adjustably carried by this post and adapted to pivotally support a bending member such as shown in Fig. 7 substituting the pin 71 for the pin 31.

Other changes may be made in the details of construction within the scope of our invention.

We claim:

1. A device for centering and supporting a clutch disc having a hub portion with a number of grooves extending longitudinally in its bored surface consisting of a supporting socket, a bushing rotatable in said socket and having a laterally projecting flange supported on the socket, a screw threaded arbor adjustable in said bushing and having a number of longitudinally tapered grooves in its periphery gradually increasing in depth upwardly away from said bushing, the upper surface of said bushing being tapered downwardly toward said arbor, relatively thin keys mounted in said grooves having outer edges adapted to engage against the bottoms of the grooves of the clutch disc, elastic means for normally pressing said keys into the grooves of the arbor and a clamping nut adjustable on the upper end of the arbor, the lower surface of said nut having a tapered centering wall for engaging the upper ends of the keys and drawing them inwardly into the grooves in the arbor as the nut is adjusted against the keys, said flange extending outwardly beyond said keys to support the hub of the disc when the hub is mounted on the keys.

2. A device for centering and supporting a clutch disc having a hub portion with a number of grooves extending longitudinally in its bored surface consisting of a supporting socket, a bushing rotatable in said socket and having a laterally projecting flange supported on the socket, a screw threaded arbor adjustable in said bushing and having a number of longitudinally tapered grooves in its periphery gradually increasing in depth upwardly away from said bushing, relatively thin keys mounted in said grooves having outer edges parallel with the axis of the arbor and adapted to engage against the bottoms of the grooves of the clutch disc, elastic means for normally pressing said keys into the grooves of the arbor and for permitting longitudinal and radial movements of the keys and a clamping nut adjustable on the upper end of the arbor for engaging the upper ends of the keys and drawing them inwardly into the grooves in the arbor as the nut is adjusted against the keys, said flange extending outwardly beyond said keys to support the hub of the disc when the hub is mounted on the keys.

CHARLES W. BAUBERGER.
EDWARD T. LIESS.